Patented Feb. 11, 1947

2,415,752

UNITED STATES PATENT OFFICE 2,415,752

PROCESS OF MAKING FRICTION MATERIAL

William Nanfeldt, Clifton, N. J., assignor to World Bestos Corp., Paterson, N. J., a corporation of New Jersey No Drawing. Original application August 16, 1938, Serial No. 225,158, now Patent No. 2,273,770, dated February 17, 1942. Divided and this application February 27, 1941, Serial No. 380,823

8 Claims. (Cl. 106—36)

This invention relates broadly to friction material, and more particularly to a friction material suitable for use as clutch facings, brake blocks and brake lining, as well as miscellaneous friction elements for diverse mechanism.

More specifically, and as exemplified in the following description, the invention relates to an improved type of molded brake lining provided with an effective heat resistant anchoring means.

Present day usage in brake lining, particularly for automotive transportation, is relatively severe due to increased speeds, high pressures, overloading factors, and various safety requirements and traffic regulations. Such requirements have brought out in previous types of brake lining a number of defects which tend to reduce the efficiency and length of service, and to increase the wear of the brake drum as well as augment dangers arising from inadequate friction under variable temperature conditions. Some of these deficiencies consist in the presence of abrasive substances, causing scoring of the iron or steel of the drum, in the employment of materials in the brake lining composition which do not resist the high pressures used in brakes, in the employment of bonding substances which fail to maintain cohesion at high temperatures, in the employment of compositions which wear rapidly in use, in the use of compositions which are subject to surface scuffing and deterioration in uses involving a combination of high pressure and high temperatures, and in various other defects.

An object of the present invention is to provide a composition suitable for brake lining which is balanced as to its physical structural elements so that it may effectively resist both normal and shearing pressures.

A further object is to provide a brake lining of the molded type which is surfaced with such materials that scuffing is prevented.

Further objects involved are the attainment of a surface composition on brake lining which is self-polishing to a limited extent as well as self-lubricating.

A further object is the provision of a surface composition in brake lining which permits a limited shift of the material so as to prevent glazing after continued use. Additional objects of the invention are to provide a heterogeneous brake lining material which includes a cellular structure in which a yieldable substance is embedded. An additional object is to provide a surface for molded brake lining possessing displaced areas of yieldable friction material which is relatively expansible at high temperatures. A further object is the provision of a molded brake lining, the elements of which have a hardness permanently lower than that of the cooperating metal brake surface. An object also is the employment of a brake lining material the hardness of which is preferably 3 or less than 3 Mohs.

Further objects of the invention are concerned with the formation of a type of brake lining which withstands high unit pressures, which maintains an efficient coefficient of friction at variable temperatures including high temperatures, which eliminates all abrasive action on the cooperating metal brake surface, which develops a controlled amount of surface slippage in conjunction with a limited degree of lubricating action and surface polishing.

Other objects of the invention will appear on consideration of the following description of the invention.

Briefly stated, and in its broadest aspects, the invention consists in the employment of an assemblage of various materials which resist pressure, shear and surface disintegration and which are present on the surface of the lining in the form of discrete units separated by bonding areas, the hardness of the composite brake lining being less than that of the metallic surface against which it cooperatively engages.

Extensive experimental investigation on the part of applicant has demonstrated that an effective brake lining, whether of the woven or molded type, should contain at least the following minimum types of elements:

(1) Density elements primarily for resisting normal pressure and exemplified by square or flat particles as certain types of clay or diatomaceous earth;

(2) Shear resisting elements primarily for resisting shearing forces and exemplified by particles which fracture with a jagged edge as mica; and (3) Surface elements intended for maintaining the proper frictional resistance for varying temperatures exemplified by small particles of the type of iron oxide or carbon.

The various particles of density material such as slip clay consist of very small perforated, plate-like particles, and hence are highly resistant to pressure normal to the surface of the lining containing them. The shear resisting particles are crystalline or non-crystalline particles of similar characteristics such as various linear, fresh water diatoms or mica, or even clay particles, which tend to fracture with a jagged or conchoidal edge, and are desirable for resisting shearing forces of the brake lining, inasmuch as these particles tend to interlock with each other and hold the whole mass in rigid and stable condition. The surfacing material such as iron oxide and carbon are both of extremely small size, and in the case of iron oxide, tend to have a self-polishing action which in part controls the frictional action of the surface. Similarly, the very small particles of carbon spread about all over the surface and tend to prevent or counteract glazing and in other ways tend to modify the surface formation to maintain the frictional values more or less constant when the lining is forced against the drum with high pressure.

The mica also acts in the surface action to delaminate and bring about a limited shifting action of the surface, thereby assisting in the control of the friction and the prevention of glaze. The surface action occurs only for a very limited depth, and the degree of shifting action can be readily controlled by the amount of materials employed.

The above materials are intermixed with suitable binding materials which should include low and high temperature substances. Preferably I employ for the high temperature bond asbestos because of its linear fibrous structure and also because it adds body and density to the composition. For the lower temperature substances I employ sulphurized linseed oil which has many desirable qualities such as relatively high melting point and a hardness less than 3 Mohs.

A specific example of a composition of materials by weight percentage, suitable for efficient brake lining operation, is given hereinbelow and will be referred to hereinafter as the "A" composition:

| Materials | Ranges | Example |
|---|---|---|
|  | Per cent | Per cent |
| Slip clay | 5 to 15 | 9.82 |
| 40 mesh coke oven coal tar coke | 1 to 5 | 3.74 |
| 150 mesh amber mica | 1 to 5 | 1.87 |
| Iron oxide | 1 to 5 | 1.87 |
| Open and cleaned XX asbestos fibre | 40 to 60 | 57.94 |
| Sulphurized linseed oil | 15 to 30 | 21.96 |
| Flowers of sulphur | 1 to 5 | 2.80 |

In the preparation of the composition as above described I place the mica, iron oxide, slip clay, coal tar coke and asbestos fibres in a tumbling barrel or revolving cylinder which is tumbled for about a half hour or until the non-fibrous filling material has been dispersed and distributed through the fibres. This mix is then placed in a mixer commonly known as a dough mixer of the type manufactured by Warner & Pfleiderer. Sulphurized linseed oil and sulphur which are stirred together cold until the sulphur is evenly distributed throughout the oil is then added to the fibres and filling material in the dough mixer, which is then operated for a period of approximately one and one-quarter hours or until a uniform mix is secured producing small ball-like particles varying in diameter from $\frac{1}{16}''$ to $\frac{1}{8}''$.

The mix is then passed through a disintegrator, preferably of the type built by Christie & Norris, Ltd. of England. This is a rotary machine employing a drum with a corrugated lining and opposed vanes which, by their whirling action, cause a thorough disintegration and breaking up of the lumps and clusters of fibres which may have been formed in the dough mixer, but nevertheless allows the mix to remain in the form of small ball-like particles. The material is then placed on shallow pans in an oven where it is heated to a temperature preferably in excess of 200° F., but not over 250° F., for between two and one-half hours and four and one-half hours.

The materials above specified have been selected after wide tests because they meet certain requirements of friction, heat resistance, hardness, pressure resistance, etc. The clay is of the type commonly known as slip clay and is formed of very small perforated and plate-like particles which have a hardness according to the Mohs' scale of approximately 2. Because of their plate-like shape these clay particles greatly add to the density resistance of the lining. This clay has a lubricating action and when mixed with the linseed oil it assists in the mixing of the "A" composition in the dough mixer.

The mica used is known as Amber mica and it is ground fine enough to pass through a 150 mesh to the inch screen. This mica is in the form of finely laminated plate-like particles which are very brittle and which have a hardness of approximately 2 Mohs. Because of their fine laminations the material tends to delaminate under pressure and shearing action, and this in turn permits shifting of the frictional surface, thereby insuring a stabilization of the coefficient of friction and preventing glazing or polishing of the lining. Because of the fineness of the laminations of this mica the surface friction occurs to only a very minute depth. The amount of surface shifting depends, of course, upon the quantity of mica used. In addition the mica is highly brittle and the jagged edges serve to interlock with other particles in the body of the lining and reduce mass shear action, thus adding to the strength of the lining.

The carbon employed is that derived from coal tar coke and has a particle size of 40 mesh and a Mohs' scale hardness somewhat less than 2. Carbon derived from this source is fragile, amorphous and porous and is free from harmful abrasives such as sand and grit, since the coke is a distillation of coal tar pitch. The particles of this carbon being fragile and breaking readily under pressure, are distributed over the entire face of the lining, and in this way tend to stabilize and control the friction of the brake lining in operation. These small particles are not anchored and hence being free to move, a hard and permanent polished carbon face cannot be formed, or the face of the lining cannot become smooth enough to retard the interlocking of the lining surface with the brake drum. Scoring from this source is also avoided because of its lesser degree of hardness than that of steel or iron.

The iron oxide used has a hardness according to the Mohs' scale of about 2½. Because of the smallness of the size of the particles, usually passing through a 200 mesh screen, the particles receive a polish from the harder, adjacent coacting substances which gives them an individual polish effective to prevent too rapid wearing of the lining surface. If no iron oxide or equivalent material were used the friction face of the lining would have a dull and dusty surface and the friction would vary in different areas. Hence the use of the iron oxide tends to make uniform and to control the frictional surface resistance of the lining.

As a vegetable oil I utilize linseed oil which may be either boiled or blown linseed oil and which may be polymerized, and which is preferably combined with approximately 2% of its weight with sulphur in order to prevent oxidation of the oil. In the preparation of the linseed oil it is heated to about 350° F. with about 2% by weight of sulphur until all of the sulphur has been absorbed. The oil is still very fluid and when combined in the dough mixer assists considerably in the mixing operation by its lubricating action on the asbestos fibres and other materials. When subjected to the higher heats of the process the oil absorbs the additional sulphur of the composition and condenses to a resilient, crumbly, solid mass having a melting point of around 425° F. This high melting point of the sulphurized linseed oil in conjunction with its resiliency makes this oil preferred as a material in this composition. The sulphurization of the oil, by preventing oxidation, eliminates the hardening effects of linseed oil and thus prevents its action as a scoring element in the composite composition. Another valuable characteristic of the sulphurized linseed oil which is imparted to the "A" composition is the relatively high expansibility with heat, thus tending to force the material into close yielding contact with the coacting brake surface.

The sulphur employed is finely ground flowers of sulphur which, as above stated, is used in part to form sulphurized linseed oil, the balance being added to the cooled sulphurized oil prior to the mixing in the dough mixer. In the finished lining the sulphur represents 14% by weight of the linseed oil.

The carbon of the mixture is in the form of coal tar coke powdered to pass a 40 to the inch mesh. This carbon is fragile, amorphous, and porous and because of its origin from coal distillates is free from harmful abrasives such as sand and grit. The hardness of the coke is slightly less than 2 Mohs.

The asbestos employed in the "A" composition is of the type commonly referred to as "double X" asbestos. This is a mine run asbestos having short fibres and has a normal hardness ranging between 3 and 3½ Mohs. By careful treatment in a rotary disintegrator or equivalent means wherein the fibre groups are shredded and separated to approximately individual fibre size, I have found that the hardness can be reduced to slightly less than 3. In this disintegration, also, all rock dust and other foreign matter is removed so that the asbestos is pure and of the requisite hardness factor.

In utilizing the balanced particle composition as above described for friction purposes as in a brake lining, I employ novel means of positioning it on the friction surface which will now be described.

In the course of my experiments I have found that a certain amount of surface shift is necessary in a brake lining, as well as a degree of elasticity or yield, which will permit the friction material to lie closely to the co-operating brake drum surface and exert its maximum frictional effect. Further, it is desirable that there be a certain amount of lubricating action as well as resistance to pressure development. To combine these characteristics in a homogeneous brake lining material offers difficulties which I have overcome by the employment of a hard and rigid cellular structure, the cells of which hold the primary friction substance, that is, the composition "A" above described.

The material of the rigid retaining structure of brake lining which I shall refer to hereinafter as composition "B" is mixed with material "A". In the completely reacted and final form of the brake lining the two substances appear as spaced spots or areas scattered all over the surface and interior of the brake lining, thus producing a combination of rigid, non-resilient material "B" bounding separated areas of the resilient primary friction material known as composition "A."

For the materials of composition "B" I employ powdered cresol-formaldehyde resin and asbestos, the relative amount of materials used in the composition "B" by weight ranging from 30% to 40% resin to 60% to 70% asbestos, or more specifically as an example, 35.43% resin and 64.57% asbestos.

In making the composition "B" the resin and the asbestos fibre are placed in a tumbling barrel and tumbled for about one-half hour or until the resin has been thoroughly dispersed throughout the fibre. This results in a whitish and fluffy material having a tendency to cohere in small lumps.

For the asbestos I have found that shingle asbestos is desirable. This consists of the long fibred asbestos which is treated similarly to the XX mine run asbestos in a distintegrator, a shaker and blower, and is then subsequently re-run through the disintegrator to further break up the fibres so that the average fibre length of the reground shingle fibre is approximately the same as the XX mine run fibre, that is, approximately three-eighths of an inch or less. By this process the percentage of rock and rock dust removed from the asbestos is greater than in the case of the mine run fibre, and the particles are more thoroughly disintegrated and broken up into the individual length, insuring a hardness less than 3 Mohs.

The resin employed is preferably the cresol-formaldehyde type which is formed by chemical reaction between formaldehyde and cresol, the proportions being such that the resin on further heating will pass over into the infusible stage. In the infusible stage resin of this type has a Mohs' scale hardness of approximately 2¾. Another characteristic of this resin is that it will not flux or combine with the sulphurized linseed oil during the hot molding operations. In addition it will stand a higher temperature than a phenol formaldehyde resin before carbonizing, and this is important in brake lining compositions.

In forming the cresol-formaldehyde resin the chemical reaction is carried to the point where condensation takes place but not to the point where the resin polymerizes. When the reaction has been carried to a point where it is a solid when cold it is ground to a powder by any suitable means and a small percentage of hexamethylenetetramine in finely powdered form is evenly distributed throughout the resin. The hexamethylenetetramine exerts a catalytic and hardening action, bringing about rapid polymerization of the cresol resin with heat, and thus the speed of the reaction of the resin may be controlled by the amount of hexamethylenetetramine added thereto. As the fully reacted cresol resin has a Mohs' scale hardness of about 2¾ it is impossible to score the steel or castiron used on brake drums.

The combination of the "A" and "B" compositions is carried out by mixing equal weights of the two materials together in a tumbling barrel for one-half hour or until the "A" composition is distributed throughout the "B" composition, and then passed through a disintegrator which causes the lumps in the "A" composition to be further broken up. The composition mix at this point is ready to be molded into sheets or slabs, or it may be stored until ready for use.

A further composition is employed in the completed brake lining which serves to form a base for the friction material. This base composition will be referred to hereinafter as the "C" composition and consists of a mixture of resin and asbestos similar to the "B" composition but of different percentages. The range values for the resin are from 20% to 30%, and for the asbestos between 60% and 80% by weight, and as an example usable in conjunction with the examples hereinabove specified I may employ cresol-formaldehyde resin 25% and shingle asbestos fibre 75%. The "C" composition is prepared by placing the resin and asbestos in a tumbling mill for about one-half hour or until the resin has been thoroughly distributed through the fibre, and then passed through a disintegrator to further open and fluff the material and remove lumps or clusters of unopened fibres. The resin employed in the "C" composition, as well as the asbestos fibre, are identical to that used in the "B" composition.

In forming the rigid molded segments from the "A," "B" and "C" compositions above described the following procedure is followed:

A predetermined amount of the "C" composition is placed in the bottom of a suitable flat mold where it is loosely and evenly distributed over the entire surface. Upon this "C" composition is then placed an evenly distributed, predetermined amount of the "A"—"B" mixture; the thickness of the total mass of the "A"—"B"—"C" compositions in the preforming mold being approximately fifteen times greater than the thickness of the finished segments. This mass is then pressed cold to a thickness which is approximately five times greater than the finished segments. This sheet or biscuit does not have sufficient strength to maintain its shape but must be handled on suitable trays.

The preformed sheet is then placed in a flat, single cavity mold which is slightly larger than the sheet, where it is compressed under a pressure of 800 pounds per square inch while heated to a temperature of 300° F. for about four minutes. Under this heat and pressure the fibres are compacted and the resin flows to form a bond around the fibres. The compressed sheet is then removed from the mold and at once curved to a suitable arc, after which it is quickly placed in a heated curved mold for further processing. Under a pressure of 800 pounds per square inch the maximum density is not imparted to the sheet but it is further compressed to a thickness of approximately 1.2 times greater than the required thickness of the finished segments. Maximum density is not imparted to the sheet in the flat, heated mold, as it would be impossible to curve the sheet thereafter without cracking, even though the bond was still fluid and plastic. Further, the material is apt to crack while removing the compressed sheet from the heated mold if maximum pressure has been previously used.

The curved, compressed sheet, after being placed in the curved mold supported by a curved pan or tray, is then compressed to its maximum density with a pressure of around 1500 pounds per square inch while heated to a temperature of around 300° F. for thirty minutes, after which it is removed from the mold and allowed to cool.

While the setting of the resinous bond is practically completed in thirty minutes, the time may be reduced to as low as ten minutes, if desired, securing only a partial setting of the resinous bond. After removal from the curved mold and cooled the sheets may be held in stock for further processing.

Continuing the process, the curved, cured sheet is next cut into segments of the required width for brake lining use by any suitable means, and then ground on all sides to the required dimensions. Allowance is made in the final compression for this grinding action, as after such compression the sheet is approximately 0.01 inch thicker than the required thickness of the finished segments. The individual, ground segments are then placed on trays or any suitable conveyor in an oven where they are baked for approximately two hours while heated at a temperature of about 225° F. In this baking operation trapped gases are removed and the resinous bond in the "B"—"C" compositions is completely transformed into its infusible state, and the sulphurized linseed oil in the "A" composition takes on its final resilient set. This completes the manufacture of the brake lining.

Alternatively to completing the finished brake lining in one continuous process, the cured sheet prior to cutting may be ground to size and baked as in the case of the individual segments, and furnished to the jobbing trade where the dealers may cut various sizes of segments from the sheet or slab.

The final finished segment is a heterogeneous mass where the frictional face consists of the rigid "B" composition acting as a skeleton framework which supports the resilient and primary "A" composition, while the "C" composition acts as a supporting back for the "A"—"B" mixture when attached to a brake shoe or a unit of a frictional device. The "C" composition represents about one-fifth of the thickness of a $\frac{3}{16}$ inch lining and about one-seventh of the thickness of a ¼ inch lining.

The completed brake lining contains the various materials of the compositions "A," "B" and "C" as follows, the possible variations by weight in accordance with the suggested variations in the compositions "A," "B" and "C" being also given:

| Materials | Ranges | Example |
|---|---|---|
|  | Per cent | Per cent |
| Sulphurized linseed oil | 6 to 12 | 8.78 |
| Flowers of sulphur | .40 to 2 | 1.12 |
| Open, cleaned XX asbestos | 16 to 24 | 23.17 |
| 150 mesh amber mica | .40 to 2 | .75 |
| Iron oxide | .40 to 2 | .75 |
| Slip clay | 2 to 6 | 3.93 |
| 40 mesh coal tar coke | .40 to 2 | 1.50 |
| Powdered cresol-formaldehyde resin | 18 to 24 | 19.17 |
| Open, cleaned shingle asbestos fibre | 39 to 50 | 40.83 |

From the above it will be seen that I have disclosed the formation of a type of brake lining having novel characteristics, particularly the features of the heterogeneous body construction of mixed materials, one rigid and the other resilient and capable of surface shift; the feature of balanced particle or crystalline structure in the primary resilient friction element which enables the material to resist normal pressure and shear and at the same time permit a limited amount of surface shifts; the feature wherein the hardness of the composite lining, as well as of the individual materials of the lining, are 3 or less than 3 Mohs' scale, or in other words, less than the hardness of the coacting metal drum surface; the feature of supplying to a brake lining an infusible base section formed integral and bonded with the friction material so as to prevent body disintegration in operation and the feature of expansibility of the "A" material with heat relative to the rigid "B" material whereby the "A" material is subjected to greater relative pressure and develops a more effective interlocking friction with increase of braking temperature. This last characteristic of expansibility is important as providing a compensating factor against the normal fall-off in friction with rise in temperature. An increase of pressure on the "A" material alone from 10 to 20 pounds or twice the pressure may easily be possible in passing from low to high temperature conditions, this being due primarily to the expansion of the "A" composition from the surface formed by the "B" composition. There is thus formed a friction surface of reduced area which, as above indicated, may be reduced fifty percent from the original area, and this increase in pressure per unit area compensates for the normal reduction in the coefficient of friction of the lining due to temperature increase.

While I have specified certain materials as entering into the various compositions of the brake lining, it is to be understood that modifications may be made of substances having equivalent properties for the purposes to which each material is utilized. As equivalents for the materials of the balanced particle structure of the "A" composition may be mentioned the following: For certain particles or crystals having a flat, square, or barrel shaped formation may be substituted, provided the hardness of the substituted materials are 3 or less, such substances as aluminum oxide, magnesium sulphate and certain of the fresh water diatomaceous earth crystals. As equivalent substances for the shear resisting particles in addition to mica might be mentioned zinc oxide, magnesium oxide, sodium borate, calcium sulphate, barium chromate and certain of the fresh water elongated type diatoms. In place of the cresol-formaldehyde resin certain of the furfural resins such as the phenol furfural resin or any other type of synthetic resin such as phenol-cresol or phenol resins which will become infusible with heat and not exceed the hardness of the drum might be employed.

As a substitute for coke, carbon black could be used, but coke is not so solid as carbon black and breaks and disperses more readily.

Further, I have found that the resiliency of the "A" composition may be modified by using other vegetable oils such as China-wood oil, either alone or in combination, which will condense to a resilient solid. These oils may be in the polymerized form if desired. I may also modify the resiliency of the "A" composition by adding up to 5% of rubber in any form, such as rubber cement from new or reclaimed rubber, finely ground rubber powder such as hard rubber dust, or finely ground reclaimed treated stock or latex.

In general, however, I prefer to use the specified substances as being most appropriate for securing the combined effects of hardness, pressure resistance, shear resistance, surface shifting, lubrication and friction generally most effective for efficient and satisfactory friction uses.

In addition to varying the materials of the composition, the proportions of the materials used may be varied so as to produce modified effects. Particularly I may change the proportionate parts in the brake lining of the "A" and "B" compositions so as to give either a greater or lesser resilient area as opposed to the rigid area.

This application is a division of my co-pending application Serial No. 225,158, filed August 16, 1938, now Patent No. 2,273,770, which is a continuation in part of my co-pending application Serial No. 29,763, filed July 3, 1935, issued as Patent No. 2,155,020 on April 18, 1939.

I claim as my invention:

1. The process of forming resilient friction material for brake lining which consists in combining sulphur with previously sulphurized linseed oil, adding this first mixture to a second mixture of mica, iron oxide, clay, coke and asbestos fibres to form a third mixture, and finally heating the third mixture in an oven at a temperature not over 250° F.

2. The process of forming resilient friction material for brake lining which consists in combining sulphur with previously sulphurized vegetable drying oil, adding this first mixture to a second mixture of mica, iron oxide, clay, carbon and asbestos fibres to form a third mixture, and finally heating the third mixture in an oven at a temperature not over 250° F.

3. The process of forming resilient friction material for brake lining which consists in combining sulphur with previously sulphurized vegetable drying oil to form a first mixture, adding this first mixture to a second mixture containing friction materials, and forming a third mixture therewith, and finally heating the third mixture in an oven at a temperature in excess of 200° F.

4. The process of forming resilient friction material for brake lining which consists in combining sulphur with previously sulphurized vegetable drying oil to form a first mixture, adding this first mixture to a second mixture containing friction materials, and forming a third mixture therewith, and finally heating the third mixture in an oven at a temperature in excess of 200° F. for a time period in excess of two and one-half hours.

5. The process of forming resilient friction material for brake lining which consists in combining at room temperature sulphur with vegetable drying oil previously sulphurized at a temperature preferably in excess of 200° F. to form a first mixture, adding this first mixture to a second mixture containing friction materials, and forming a third mixture therewith, and finally heating the third mixture in an oven at a temperature in excess of 200° F.

6. The process of forming resilient friction material for brake lining which consists in combining sulphur with previously sulphurized vegetable drying oil, adding this first mixture to a second mixture of mica, iron oxide, clay, carbon and asbestos fibres to form a third mixture, passing this third mixture through mixing and disintegrating apparatus, and finally heating the third mixture in an oven at a temperature not over 250° F.

7. A process of making a friction material which comprises adding about 2% by weight of sulphur to linseed oil heated in excess of 215° F., adding sufficient additional sulphur to the cooled sulphurized linseed oil to make over 10% of sulphur in relation to oil, mixing the sulphurized oil with brake lining materials, and heating at a temperature over 200° F. to form a friction material.

8. A process of making friction material which comprises adding about 2% by weight of sulphur to linseed oil heated to above 215° F., adding 6% to 17% of sulphur by weight to said sulphurized oil when cool, mixing the sulphur and sulphurized linseed oil with friction materials including asbestos, and heating this final mixture to a temperature of over 200° F. for over two hours to form the friction material.

WILLIAM NANFELDT.

REFERENCES CITED

The following references are of record in the file of this patent:

UNITED STATES PATENTS

| Number | Name | Date |
| --- | --- | --- |
| 1,882,702 | Alley | Oct. 18, 1932 |
| 2,273,770 | Nanfeldt | Feb. 17, 1942 |
| 2,175,480 | Nanfeldt | Oct. 10, 1939 |
| 1,924,021 | Blume | Aug. 22, 1933 |
| 2,129,794 | Spokes | Sept. 11, 1938 |